March 20, 1951     H. H. MONTAGUE     2,545,585
MOWING MACHINE HANDLE
Filed Aug. 14, 1946
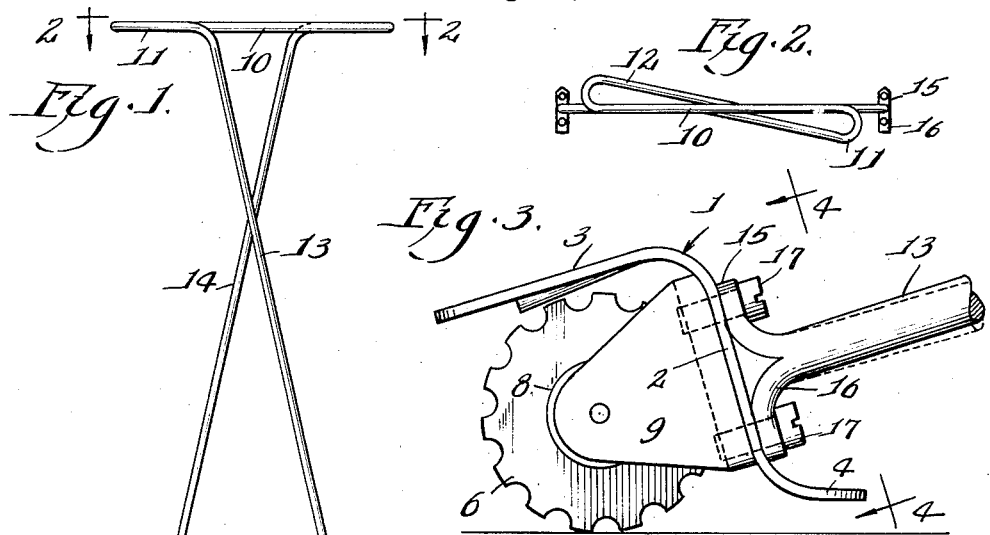
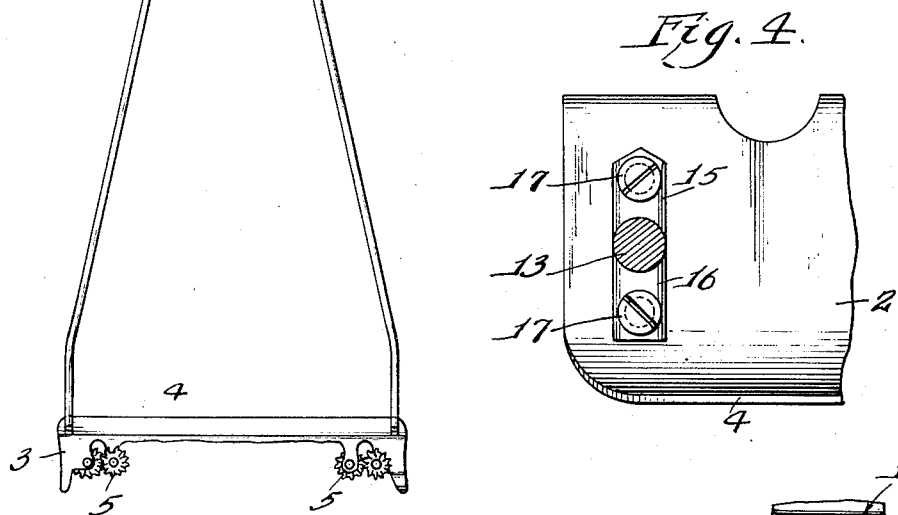
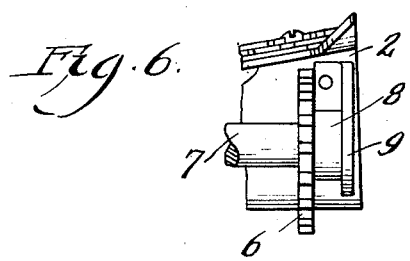
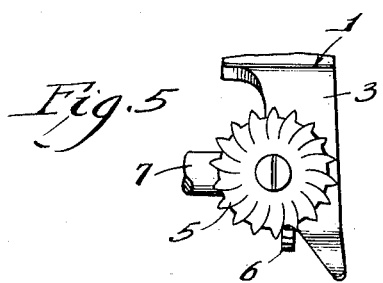
INVENTOR:
Hubert H. Montague,
BY Wm. F. Freudenreich,
Attorney.

Patented Mar. 20, 1951

2,545,585

UNITED STATES PATENT OFFICE 2,545,585

MOWING MACHINE HANDLE

Hubert H. Montague, Traverse City, Mich.

Application August 14, 1946, Serial No. 690,529

2 Claims. (Cl. 16—111)

1

The present invention relates particularly to small, hand-operated mowing machines of the type disclosed in my prior Patents Nos. 1,317,212 and 1,465,279, and has for its object to improve the same.

Machines of the aforesaid type are especially suited for cutting weeds and high, stiff grasses. Such grasses offer different problems in the matter of disposal of cuttings and clogging than are present when cutting relatively short grass with conventional lawn mowers. Viewed in one of its aspects, the present invention may be said to have for an object to make it easier for the cuttings to fall clear of the machine and more difficult for the same or standing grass to cause clogging.

When mowing tall weeds or grasses the machine may strike roots, rocks or other obstructions concealed by the former. In such a case, if the user is holding the handle in front of and close to his body, the handle may give his body a rude blow when the machine stops abruptly while the user is still moving ahead.

One of the objects of the present invention is to provide means to absorb or at least fairly well cushion the shock which would otherwise be transmitted to the user when the machine is driven against an obstruction.

A further object of the present invention is to provide simple and novel means for adjusting the angle at which a handle that is rigidly fastened to the mower, proper, may stand.

The various features of novelty whereby the present invention is characterized will hereinafter be pointed out with particularity in the claims, but, for a full understanding of the invention and of its objects and advantages, reference may be had to the following detailed description taken in connection with the accompanying drawing, wherein:

Figure 1 is a view of a mowing machine that embodies the present invention, lying flat in a horizontal position, with the greater part of the cutting mechanism broken away; Fig. 2 is a view looking at the handle, only, from line 2—2 of Fig. 1; Fig. 3 is an end view, on a much larger scale than Figs. 1 and 2, of the mowing machine proper, only a small fragment of the handle being shown; Fig. 4 is a section on line 4—4 of Fig. 3; Fig. 5 is a top plan view, on a somewhat smaller scale than Fig. 3, of a fragment of the machine at the end shown in the latter; and Fig. 6 is a front view, showing so much of the machine as appears in Fig. 5.

In the drawing, 1 represents a long frame

2 member in the form of a light weight beam having a web 2, a wide upper flange 3, arranged approximately at right angles to the web and projecting forwardly therefrom, and a narrow lower flange 4 that projects rearwardly and constitutes a tail piece. Rotary cutters 5 are distributed lengthwise of the upper flange and are driven from toothed wheels 6 (of which only one is shown) fixed to a transverse shaft 7 and resting on the ground. Parts 5, 6 and 7, as shown, are not substantially different from the corresponding parts in the aforesaid Patent No. 1,465,279. However, the means for supporting the shaft is novel, each end of the shaft being engaged in a bearing 8 (only one being shown) carried by a forwardly-projecting pedestal 9 fastened to the web of the frame member at the corresponding extreme end of the frame member. The outer face or side of each pedestal is smooth and flat, whereby the pedestals serve as effective guards to prevent grass from being drawn in through the ends of the frame and wrapping itself around the shaft.

The improved handle for the machine consists of a single slender round steel rod bent into a modified T shape; the cross arm of the T consisting of a straight piece 10 connected by inwardly bent sections 11 and 12 to long stem sections 13 and 14. Sections 11 and 12 have a combined length considerably less than that of straight section 10. Thus the cross bar of the handle may be said to be in the form of a flattened, partially open loop, the gap therein separating the upper ends of the stem sections for a distance equal to about one third of the length of the straight piece 10. The stem sections are approximately at right angles to the plane of the loop and are oppositely inclined to the axis of the handle, crossing each other a short distance from the handle bar or cross piece, so that their free ends can be spread as far apart as the length of the frame member 1.

The free ends of the stem sections of the handle device are attached to the web of frame member 1, near the ends of the latter, in such a manner that when the handle is turned over so as to reverse the positions of the stem sections, the angle thereof with respect to the plane of flange 3 is varied. This shift results in raising or lowering the handlebar, as the case may be, for a given cutting level. In the arrangement shown, each end of the round rod of which the handle is made is split, one lip 15 being bent up and the other lip 16 being bent down. These lips do not stand at right angles to the plane of the stem portion of the handle; and therefore, when lips 15 are on the upper side, the handle proper assumes the position shown in full lines in Fig. 3, whereas, when the lips 16 are on top, the position of the handle is that shown in broken lines. The lips are held in place by screws 17, that pass through the same, through the web and into the corresponding pedestals 9.

It will be seen that when cutting tall growths with my improved machine, the cuttings are afforded a clear space between the two slender stem sections of the handle through which to fall back behind the machine proper. Furthermore, the tail flange compels such cuttings to pass well back of the cutting zone before dropping on the ground. Therefore the cuttings are disposed of in a satisfactory manner and the danger of clogging the cutting mechanism is practically eliminated.

It will also be seen that not only can the handle be readily adjusted so that grass may be cut at either of two different heights with the handlebar at a given level, but the resiliency of the handle device affords the operator protection against jarring blows in the event that the machine stops suddenly because striking an obstruction.

While I have illustrated and described with particularity only a single preferred form of my invention, I do not desire to be limited to the exact details thus illustrated and described, but intend to cover all forms and arrangements that come within the definitions of my invention constituting the appended claims.

I claim:

1. A resilient handle for a mowing machine or the like composed of a long bent rod of resilient metal having the form of a grip piece composed of a straight transverse section that merges at its ends into like inturned sections about one third as long as and lying on opposite sides and in the same plane with said transverse section, and straight stem sections leading from the inner ends of the inturned sections and arranged in the form of an X in a plane approximately at right angles to the aforesaid plane.

2. A resilient handle as set forth in claim 1, wherein the stem sections cross each other about one third of their lengths from their inner ends.

HUBERT H. MONTAGUE.

REFERENCES CITED

The following references are of record in the file of this patent:

UNITED STATES PATENTS

| Number | Name | Date |
|---|---|---|
| D. 123,113 | Loud et al. | Oct. 15, 1940 |
| 392,282 | Moyer | Nov. 6, 1888 |
| 753,138 | Hubbell | Feb. 23, 1904 |
| 1,317,212 | Montague | Sept. 30, 1919 |
| 1,389,249 | Kitchel | Aug. 30, 1921 |
| 1,465,279 | Montague | Aug. 21, 1923 |
| 1,486,758 | Jerram | Mar. 11, 1924 |
| 2,008,129 | Cornia | July 16, 1935 |
| 2,252,126 | Kersey | Aug. 12, 1941 |
| 2,476,036 | George et al. | July 12, 1949 |